United States Patent

Emi et al.

[11] Patent Number: 6,013,182
[45] Date of Patent: Jan. 11, 2000

[54] SELECTIVELY PERMEABLE HOLLOW FIBER MEMBRANE AND PROCESS FOR PRODUCING SAME

[75] Inventors: Shingo Emi; Kouzi Soga; Shoji Mizutani, all of Iwakuni, Japan

[73] Assignee: Teijin Limited, Osaka, Japan

[21] Appl. No.: 08/837,475

[22] Filed: Apr. 18, 1997

[30] Foreign Application Priority Data

| Apr. 19, 1996 | [JP] | Japan | ................................ 8-098457 |
| Aug. 13, 1996 | [JP] | Japan | ................................ 8-229416 |
| Sep. 5, 1996 | [JP] | Japan | ................................ 8-253992 |
| Sep. 19, 1996 | [JP] | Japan | ................................ 8-247770 |
| Oct. 30, 1996 | [JP] | Japan | ................................ 8-288255 |
| Dec. 5, 1996 | [JP] | Japan | ................................ 8-325281 |

[51] Int. Cl.$^7$ .................................................. B01D 39/00
[52] U.S. Cl. ........................... 210/500.23; 210/500.29; 210/500.31; 210/500.32; 210/321.71; 210/321.87; 264/200
[58] Field of Search ................. 210/500.23, 500.29, 210/500.3, 500.31, 500.32, 321.87, 321.71; 264/177.14, 200

[56] References Cited

U.S. PATENT DOCUMENTS

| 3,745,202 | 7/1973 | Riggleman et al. . |
| 4,276,173 | 6/1981 | Kell et al. ........................ 210/500.21 |
| 4,342,711 | 8/1982 | Joh et al. ................................. 264/41 |
| 4,543,221 | 9/1985 | Chen et al. . |
| 4,681,713 | 7/1987 | Miiyagi et al. . |
| 4,780,205 | 10/1988 | Murakami et al. ................ 210/500.23 |
| 4,857,196 | 8/1989 | Manabe et al. ...................... 210/500.3 |
| 4,886,631 | 12/1989 | Suzuki et al. ............................ 264/48 |
| 4,919,809 | 4/1990 | Yamamoto et al. .............. 210/500.23 |
| 4,980,063 | 12/1990 | Mahoney et al. ................. 210/500.31 |
| 5,063,009 | 11/1991 | Mizutani et al. ........................ 264/49 |
| 5,387,345 | 2/1995 | Dueg et al. ............................. 210/645 |
| 5,505,890 | 4/1996 | Düweg et al. ..................... 264/177.14 |
| 5,849,189 | 12/1998 | Emi et al. ......................... 210/500.23 |

FOREIGN PATENT DOCUMENTS

| 10570826 | 11/1993 | European Pat. Off. . |
| 20598690 | 5/1994 | European Pat. Off. . |
| 10697242 | 2/1996 | European Pat. Off. . |
| 20716859 | 6/1996 | European Pat. Off. . |
| 54-15030 | 2/1979 | Japan . |
| 54-116422 | 9/1979 | Japan . |
| 54-151614 | 11/1979 | Japan . |
| 62-117812 | 5/1987 | Japan . |
| 62-294405 | 12/1987 | Japan . |
| 63-109871 | 5/1988 | Japan . |
| 29427 | 1/1990 | Japan . |

Primary Examiner—Ana Fortuna
Attorney, Agent, or Firm—Sughrue, Mion, Zinn, Macpeak & Seas, PLLC

[57] ABSTRACT

A selectively permeable hollow fiber membrane for blood dialysis consisting substantially of a cellulose derivative, which has at least a dense layer on the innermost side and a porous layer of greater void percentage on the outside, and a process for producing the selectively permeable hollow fiber membrane consisting substantially of a cellulose derivative, which comprises extruding a spinning solution containing a polymer consisting substantially of a cellulose derivative dissolved in an organic solvent, from an annular slit into a filamentous form, while simultaneously introducing a core material solution with a water content of at least 50 wt % into the extruded filamentous body, and then immersing the filamentous body into a coagulating solution after passing it through a gas.

11 Claims, 4 Drawing Sheets

INNER SIDE
DENSE LAYER (0.6 μm)

INNER SIDE

SELECTIVELY PERMEABLE HOLLOW FIBER MEMBRANE AND PROCESS FOR PRODUCING SAME

BACKGROUND OF THE INVENTION

1. Field of the Invention

The present invention relates to a selectively permeable hollow fiber membrane. More specifically, it provides a selectively permeable hollow fiber membrane which has a specific ultrafiltration rate and a specific overall mass transfer coefficient for dextran and sieving coefficient for albumin in dialyzers, has selective permeability to exhibit excellent separating performance, and which is suitable for such blood treatment as blood dialysis and blood filtration dialysis, being particularly suitable for removal of harmful substances in the medium high molecular weight range.

2. Description of the Related Art

Selectively permeable hollow fiber membranes have been used in common practice for reverse osmosis and blood dialysis. In particular, hollow fiber blood dialyzers are currently in wide use for purification of blood of kidney failure patients. Such dialyzers have a plurality of dialysis membranes, for example hollow fiber membranes in a cage-like housing, and the patient's blood is allowed to flow through the inner hollow while the dialyzing fluid is allowed to flow on the outside, i.e. between the hollow fibers, for dialysis through the hollow fiber membranes to remove waste products from the blood and rectify electrolyte concentrations, with ultrafiltration carried out by differential pressure between the inside and outside of the hollow fibers, to remove excess water from the blood. Hollow fibers are also sometimes used for treatment of autoimmune patients, by separating only the plasma from the blood, or by removing specific components from the plasma. Recently, therapeutic effects have been confirmed for the use of hollow fibers in protein-permeable blood dialysis and protein-permeable blood filtration dialysis.

Such hollow fibers for blood processing must be selectively permeable to specific substances, depending on the purpose. Their performance is determined based on the material of the hollow fibers as well as the porosity (size and number of pores, etc.) and membrane thickness.

Incidentally, recent years have seen an emphasis on the need for removal of harmful substances in the relatively medium high molecular weight range which are related to long-term complications in dialysis patients, such as $\beta_2$-MG (microglobulin) (molecular weight: 11,800) believed to be a causative substance of dialysis amyloidosis, parathyroid hormone (molecular weight: approximately 9,500) believed to be connected with itching sensation and hyperlipidemia, erythroblast inhibiting factor believed to be connected with anemia, and substances of molecular weight 20 to 40 thousand which are believed to be connected with arthralgia and ostealgia. On the other hand, loss of albumin (molecular weight: 66,000) which is essential to the human body must be avoided at all costs. In other words, there is a demand for selectively permeable membranes with a satisfactory sharp cut-off of molecular weight fractions, having excellent permeability to substances of molecular weight 40 to 50 thousand and lower while blocking substances of molecular weight 60,000 and greater.

However, although conventional polysulfone and other synthetic polymers, for example as in Japanese Examined Patent Publication No. 2-18695 and No. 5-54373, have been relatively satisfactory in terms of the demands mentioned above, in the case of cellulose derivatives, particularly triacetates such as in Japanese Examined Patent Publication No. 58-24165, in order to use substances such as liquid paraffin, higher alcohols and isopropyl myristate, which have no coagulability for triacetate spinning solutions, as the core materials for wet spinning of the hollow fibers, it is necessary to increase the triacetate concentration in the spinning solution for higher spinnability during spinning. Also, since hardening occurs with the coagulating solution on the outer surface of the hollow fibers after spinning the spinning solution from the nozzle, a dense structure layer forms on the outer surface of the hollow fibers.

For these reasons, conventional cellulose derivative hollow fibers have had a lower density difference between the structural dense layer and the porous layer in comparison to synthetic polymer membranes, almost to the point of becoming an entire uniform layer, and thus the substance permeability has been less than satisfactory. Attempts have therefore been made to improve the permeability by reducing the membrane thickness, but satisfactory results have not been achieved. In addition, since the difference between the dense layer and porous layer of the membrane structure is poorly defined, there has been much room for improvement in terms of the fractionating properties for the permeating substances.

SUMMARY OF THE INVENTION

It is an object of the present invention to overcome these problems of the prior art by using a cellulose derivative polymer to provide a porous-dense structure similar to the structure of conventional synthetic polymers, and thus impart high molecular weight fractionating properties. It is a particular object to provide a selectively permeable hollow fiber membrane which allows more efficient removal of harmful substances in the medium high molecular weight range, such as $\beta_2$-MG, and non-permeability of useful substances such as albumin, during blood dialysis and blood filtration dialysis, as well as a process for its production.

As a result of diligent research aimed at achieving this object, the present inventors have completed the present invention upon the finding that vastly superior separation performance is exhibited by blood purifiers employing hollow fibers having a specific ultrafiltration rate and a specific overall mass transfer coefficient for dextran and sieving coefficient for albumin.

In other words, the present invention provides a selectively permeable hollow fiber membrane for blood dialysis consisting substantially of a cellulose derivative, which has at least a dense layer on the innermost side and a porous layer of greater void percentage on the outside, which has an ultrafiltration rate (UFR) of at least 50 ml/mmHg·hr·m$^2$ as measured with purified water at 37° C., which has an overall mass transfer coefficient ($K_0$) for dextran of at least $2.0 \times 10^{-5}$ cm/sec when measured using a 0.1 wt % aqueous solution of dextran of molecular weight 10,000 and a sieving coefficient for albumin ($SC_{Alb}$) of 0.1 or lower after one hour perfusion of bovine plasma, when the measurements are made with the hollow fiber membrane incorporated into a dialyzer.

The present invention further provides a process for producing a selectively permeable hollow fiber membrane consisting substantially of a cellulose derivative, which comprises extruding a spinning solution containing a polymer consisting substantially of a cellulose derivative dissolved in an organic solvent, from an annular slit into a filamentous form, while simultaneously introducing a core material solution with a water content of at least 50 wt % into the inside of the aforementioned extruded filamentous body, and then immersing the filamentous body into a coagulating solution after passing it through a gas.

DESCRIPTION OF THE PREFERRED EMBODIMENTS

Figure 1:
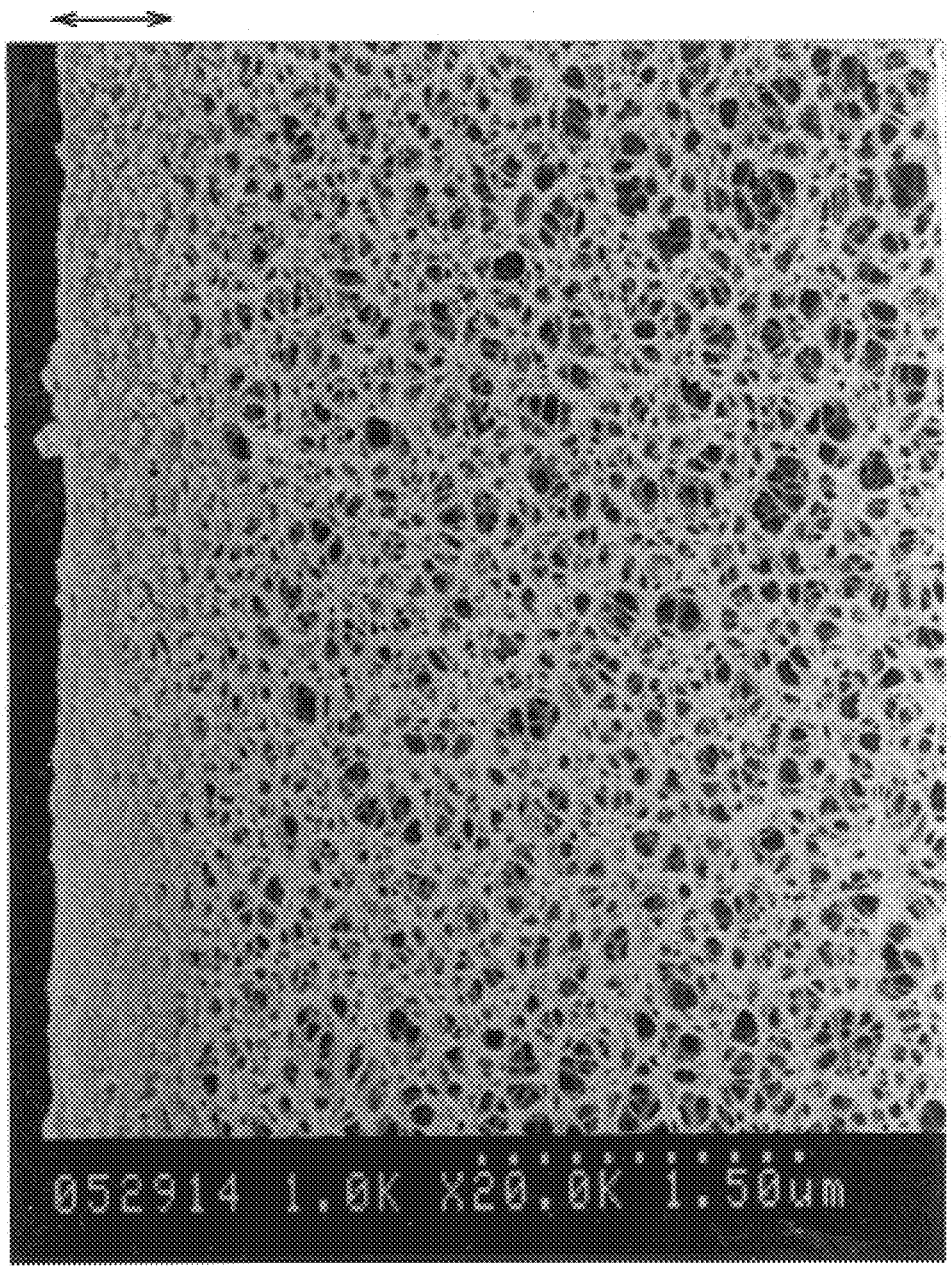
FIG. 1 is an electron micrograph (20,000×) showing a cross-section of a hollow fiber membrane obtained in an example (including the dense layer and the porous layer).

The hollow fiber membrane of the present invention is selectively permeable, and it is made of a cellulose derivative material, particularly acetyl cellulose, among which are included commonly used polymers composed substantially of cellulose diacetate or cellulose triacetate. By "substantially" is meant that it may contain other polymers and additives so long as the properties of the cellulose derivative are not impaired.

Regarding the wall of the hollow fiber membrane of the invention, it preferably has a double or multilayer structure which has conventionally been achieved with synthetic polymers, that is, which combines an ultrathin dense layer and a porous layer which can withstand mechanical flow pressure but lacks virtually any permeation resistance to substances, in order to separate the functions of substance separation permeation properties and mechanical properties. In particular, when blood is processed by passing through the inside of the hollow fiber membrane, there is preferably at least a dense layer on the innermost side of the hollow fibers. A porous layer on the innermost side will result in adhesion of blood proteins to that section, or their invasion into the pores, thus posing the risk of obstructing permeation of substances.

The ultrafiltration rate (UFR) of the hollow fiber membrane of the invention measured with purified water at 37° C. is at least 50 ml/mmHg·hr·m², preferably at least 100 ml/mmHg·hr·m², and more preferably at least 200 ml/mmHg·hr·². Such high level ultrafiltration rates have been difficult to achieve with conventional membranes having relatively uniform structures. A UFR of this level allows a lower TMP (differential pressure on both sides of the hollow fiber membrane) for constant water drainage, and minimizes adhesion of blood proteins to the hollow fiber membrane. For example, for dialysis of bovine blood, 2-liter drainage for 4 hours with a dialyzer having an effective surface area of 1.5 m² requires a TMP of 20–30 mmHg when the dialyzer employs conventional cellulose acetate-based hollow fibers, but when the dialyzer employs hollow fibers according to the invention, a TMP of about ½, i.e., less than 20 mmHg, for example between 10 mmHg and 20 mmHg, is adequate. Also, a high ultrafiltration rate indicates high permeation of low molecular weight substances including not only water molecules, but also urea, creatinine and uric acid, and is therefore desirable for basic performance of the dialyzer.

One of the characteristics of the hollow fiber membrane of the invention is an overall mass transfer coefficient $K_O$ for dextran 10,000 of at least $2.0 \times 10^{-5}$ cm/sec, preferably at least $4.0 \times 10^{-5}$ cm/sec, and more preferably at least $6.7 \times 10^{-5}$ cm/sec, in a dialyzer in which the hollow fiber membrane is incorporated. As the method for measuring $K_O$, first a cylindrical vessel is filled with a bundle of the hollow fibers to a filling factor of about 52% and both ends are sealed fast with an adhesive, after which they are cut to open the hollow sections and then incorporated into a dialyzer with an effective membrane surface area of 1.5 m², and the concentration in the effluent on the blood side is measured upon flowing a 0.1 wt % aqueous solution of dextran 10,000 through the blood side, i.e. the hollow section side at a rate of 200 ml/min at 37° C. and flowing water on the dialysate side, i.e. the hollow fiber gap section side, at a rate of 500 ml/min, after which $K_O$ is calculated from the following equation. The dextran concentration in the sampling solution is measured, for example, by the anthrone-sulfuric acid method.

$$1/K_0 = \frac{(1 - Q_B/Q_D)A}{Q_B \ln\left(\frac{1 - DA/Q_D}{1 - DA/Q_B}\right)}$$

$Q_B$: flow rate on blood side (ml/sec)
$Q_D$: flow rate on dialysate side (ml/sec)
DA: dialysance of dextran 10,000; measuring method based on evaluation method by the In vitro Evaluation Working Group of the Japan Committee on Dialysis Medicine Science
A: hollow fiber membrane effective surface area (cm²): membrane area based on inner diameter standard, with hollow fiber membrane in moistened state.

The hollow fiber membrane of the invention is characterized by having a sieving coefficient for albumin ($SC_{Alb}$) of 0.1 or lower, preferably 0.04 or lower, and more preferably 0.02 or lower, as measured after one hour perfusion of bovine plasma on the blood side, with the hollow fiber bundle incorporated into a dialyzer.

The hollow fiber membrane of the invention also has a sieving coefficient for dextran ($SC_{DX}$) of at least 0.05 in an aqueous solution of dextran of molecular weight 70,000, measured with the hollow fiber membrane incorporated into a dialyzer, and an $SC_{Alb}/SC_{DX}$ ratio of 0.12 or less, and preferably 0.10 or less, for the sieving coefficient for albumin ($SC_{Alb}$) with respect to the $SC_{DX}$, after one hour of perfusion of bovine plasma.

It was found that membranes which have a thin dense layer on the inner side of the hollow fibers and a porous layer on the outer side in this manner exhibit a relatively high sieving coefficient for substances of middle high molecular weight such as dextran (molecular weight: 70,000) in aqueous solution systems, but that the sieving coefficient for albumin, which has a similar molecular weight, is smaller in plasma or total blood systems. It was found that while the sieving coefficient for filtration of middle high molecular weight substances in such cases is much lower in plasma systems than in aqueous systems, the permeability coefficient is virtually unaffected by diffusion.

Hollow fiber membranes with a structure which exhibits no more than a given value of reduction in the sieving coefficient of middle high molecular weight substances in plasma systems compared to aqueous solutions, allow reduction in permeation by filtration without decrease in permeation (dialyzing performance) by diffusion of the middle high molecular weight substances, to achieve a vast improvement in the separating properties for substances of molecular weight approximately 10,000 and substances of molecular weight approximately 70,000, for example.

Thus, the hollow fiber membrane of the invention has satisfactory permeation of water, low molecular weight substances and dextran of molecular weight 10,000, and an adequately inhibited permeability for albumin of molecular weight approximately 66,000 through the hollow fiber membrane, for sharp fractionating properties between the two molecular weights.

The method for measuring the sieving coefficient (SC) for albumin and dextran was based on the Bovine Plasma in vitro Evaluation Protocols and Function Classification for Blood Purifiers (issued Nov. 12, 1994). The concentration measurement was carried out with an A/G B-Testwako (Wako Junyaku, KK.).

$$SC = \frac{2C_F}{(C_{Bi} + C_{Bo})}$$

$C_F$: solution concentration on filtrate side
$C_{Bi}$: inlet solution concentration on blood side
$C_{Bo}$: outlet solution concentration on blood side The hollow fiber membrane of the present invention preferably has an ultrafiltration rate of at least 25 ml/mmHg·hr·m² when measured using bovine plasma at 37° C., with an ultrafiltration rate retention of 70% or greater, and especially 80% or greater, when filtering bovine plasma at a filtration rate of 10 ml/min per 1 m² of membrane area in a module prepared using the hollow fiber membrane. An ultrafiltration rate retention of below 70% is not preferred as it may result in a large reduction in the filtration efficiency due to clogging, and also may cause a reduction in clearance of low molecular weight substances.

The ultrafiltration rate retention according to the present invention is the ratio of the ultrafiltration rate at 4 hours after the start of the bovine plasma filtration, to the ultrafiltration rate at 15 minutes after the start of filtration. Retention rate=Properties at 4 hours after start of bovine plasma filtration/properties at 15 minutes after start of bovine plasma filtration.

The lower thickness of the dense layer on the innermost side of the hollow fiber membrane of the invention gives more excellent permeation properties, and is generally no more than 2 μm, through preferably between 0.2 μm and 1 μm. At less than 0.1 μm the albumin fractionating property is impaired.

The void percentage of the dense layer on the innermost side of the hollow fiber membrane is one of the factors determining the permeability and fractionating property, and to minimize loss of albumin during blood filtration dialysis, the void percentage is preferably not greater than 30%. The void percentage may be measured by calculation based on an electron micrograph (10,000× magnification) of the hollow fiber membrane cross-section. Specifically, after blackening the pore sections in the dense layer portion of the electron micrograph, the overall pore area of the dense layer ($S_1$) and the area of the entire dense layer ($S_2$) are determined with an image processing apparatus, and the void percentage is calculated from the following equation.

void percentage=$(S_1/S_2) \times 100(\%)$

The structure of the membrane wall of the hollow fiber membrane of the invention is preferably a double or multi-layer structure which has conventionally been realized with synthetic polymers, that is, which combines an ultrathin dense layer and a porous layer which can withstand mechanical flow pressure but has virtually no effect on permeation resistance to substances, in order to separate the functions of substance separation permeation properties and mechanical properties. In particular, when blood is processed by passing through the inside of the hollow fiber membrane, there is preferably at least a dense layer on the innermost side of the hollow fibers. A porous layer on the innermost side will result in adhesion of blood proteins to that section, or their invasion into the pores, thus posing the risk of obstructing permeation of substances. The hollow fiber membrane of the present invention may also have a dense layer on the outermost side.

The thickness of the hollow fiber membrane is preferably thin from the general standpoint of substance permeability, but with the structure of the invention having 2 or more layers, it is preferably 15–60 μm, and more preferably 20–55 μm, and even more preferably 30–50 μm, considering the aspect of mechanical strength in light of the porous layer. Problems may occur when the membrane thickness is less than 15 μm such as failure to provide sufficient strength, and also when it is greater than 60 μm, such as lower dialysis efficiency.

The inner diameter of the hollow fiber membrane of the invention is 100–300 μm, and more preferably 150–250 μm. When the inner diameter is less than 100 μm blood pressure loss increases drastically, sometimes causing hemolysis and clotting. A problem may also arise when the inner diameter is greater than 300 μm, in that the dialysis efficiency is lowered.

The porosity of the hollow fiber membrane of the invention is preferably 50–90%. When the porosity is lower than 50%, the desired permeation performance may not be achieved. A problem may arise when it is greater than 90%, in that the mechanical strength of the hollow fiber membrane is reduced, often leading to leaking due to handling during production.

The porosity is measured by washing the hollow fiber membrane in water for one hour, and then removing the water from the surface of the hollow fibers and inside the hollow fibers, measuring their weight (weight $W_1$), measuring the absolute dry weight of the hollow fiber membrane (weight $W_2$), and finally calculating the porosity from the following equation.

porosity=$(1-W_2/W_1) \times 100\%$

The absolute dryness is the state after drying for 3.5 hours in a hot-air drier at 130° C.

The hollow fiber membrane of the invention preferably has a breaking strength of at least 20 g, and more preferably at least 28 g.

The sieving coefficient of the hollow fiber membrane of the invention for $\beta_2$-microglobulin ($\beta_2$-MG) is generally at least 0.5. The $\beta_2$-MG sieving coefficient is preferably as high as possible, considering the need for removal of harmful substances in the relatively medium high molecular weight range, such as $\beta_2$-MG (molecular weight: 11,800) which is believed to be a causative substance of dialysis amyloidosis, and substances of molecular weight 20 to 40 thousand which are believed to be connected with arthralgia and ostealgia.

Although a higher $\beta_2$-MG sieving coefficient is preferred, it is normally no higher than 0.95.

The selectively permeable hollow fiber membrane of the present invention preferably has shrinkage rate of no more than 7%, and especially no more than 6% in the lengthwise direction of the hollow fibers, upon 20 minute processing in 121° C. saturated water vapor under substantially zero tension.

The phrase "substantially zero tension" means heat treatment in a state in which no deliberate tension is applied to the hollow fiber membrane. However, measurement of the length of the hollow fiber membrane to calculate the shrinkage rate is carried out while applying enough tension to eliminate large bends in the hollow fiber membrane. The shrinkage rate is calculated as follows.

{(length of hollow fiber membrane before heat treatment-length of hollow fiber membrane after heat treatment)/length of hollow fiber membrane before heat treatment}×100(%)

The length is measured with the hollow fiber membrane in a moistened state.

The hollow fiber membrane of the invention which has been treated in this manner preferably has an ultrafiltration rate (UFR) of 100 ml/mmHg·hr·m$^2$ at 37° C., and an overall mass transfer coefficient ($K_0$) for dextran of at least $4.0\times10^{-5}$ cm/sec when measured using a 0.1 wt % aqueous solution of dextran of molecular weight 10,000 and a sieving coefficient for albumin ($SC_{Alb}$) of 0.03 or lower after one hour perfusion of bovine plasma, when the measurement is made with the hollow fiber membrane incorporated into a dialyzer.

A selectively permeable hollow fiber membrane having the aforementioned superior properties may be produced by a process comprising, as explained above, extrusion of a spinning solution containing a polymer consisting substantially of a cellulose derivative dissolved in an organic solvent, from an annular slit into a filamentous form, with simultaneous introduction of a core material solution with a water content of at least 50 wt % into the aforementioned extruded filamentous body, and then immersion of the filamentous body into a coagulating solution after passing it through a gas.

The solvent for the cellulose derivative may generally be N-methylpyrrolidone, dimethylformamide, dimethylacetamide, dimethylsulfoxide or the like, because water has satisfactory compatibility with these organic solvents while coagulability is exhibited for the cellulose derivative dope. It is therefore possible to form a dense layer in the inside of the hollow fiber membrane by using an aqueous solution as the core material for spinning.

The aqueous solution used may generally be an aqueous solution of the above-mentioned solvent, and it may also contain a swelling agent, non-solvent or other additive. Swelling agents include formamide, urea, triethylphosphate, glyoxal, butanol, isopropanol, etc. and non-solvents include ethylene glycol, triethylene glycol, polyethylene glycol, glycerine, propylene glycol, alcohols, etc.

When the water content of the aqueous solution is under 50%, an ultrathin dense layer providing molecular weight fractionation for medium high molecular weight substances is not formed. The aqueous solution used as the core material must have a water content of at least 50 wt %, and preferably at least 70 wt %.

On the other hand, if the water content of the aqueous solution is too high, coagulation of the dope ejected from the nozzle increases suddenly, lowering the spinnability and tending to result in fiber breakage. For this reason, the spinning draft is preferably no greater than 5, and more preferably no greater than 3. The spinning draft is the ratio of the drawing rate of the hollow fibers with respect to the linear ejection rate of the dope from the nozzle.

In the process of the invention, preferably, a spinning solution of a cellulose derivative dissolved in an organic solvent which contains 0–50 wt % of a polyhydric alcohol and can dissolve the cellulose derivative, is ejected from a tube-in-orifice type nozzle using as the core material an aqueous solution containing a total of 5–30 wt % of the polyhydric alcohol and the organic solvent, and is then immersed in a coagulating solution after passing it through a gas for 0.0001–0.02 minute.

The polyhydric alcohol which may be mixed with the organic solvent functions as a non-solvent for the cellulose derivative. Such polyhydric alcohols include propylene glycol, ethylene glycol, triethylene glycol and polyethylene glycol, of which propylene glycol is particularly preferred.

The combination of the organic solvent and the polyhydric alcohol is preferably a combination of N-methylpyrrolidone and propylene glycol.

The concentration of the cellulose derivative in the spinning solution is not particularly limited, but is normally 5–18 wt %, and preferably 10–15 wt %. If it exceeds 18 wt % the porous support layer may exhibit a tendency toward greater density, thus notably lowering its ability to remove $\beta_2$-MG, etc. If it is less than 5 wt % the viscosity of the spinning solution may become too low, making it difficult to produce fibers.

The organic solvent/polyhydric alcohol ratio (wt) in the spinning solution is usually 100/0–50/50, preferably 85/15–65/35, and more preferably 83/17–70/30.

The core material forms a thin dense layer inside the hollow fibers which has excellent fractionating properties, and it is preferably an aqueous solution containing a total of 5–30 wt % of the organic solvent and the polyhydric alcohol used in the spinning solution, and is more preferably an aqueous solution containing them at a lower concentration of 10–20 wt %. If the content is greater than 30 wt % the coagulation rate may be slowed drastically, making it difficult to form a dense layer, and if it is lower than 5 wt % the thickness of the dense layer may become too great, resulting in poor ability to remove medium high molecular weight substances such as $\beta_2$-MG.

The coagulating bath must form a porous layer by causing mild coagulation of the outer layer of the hollow fibers, and for this purpose the total concentration of the organic solvent and the polyhydric alcohol (non-solvent) is preferably at least 20% higher than in the core material, for example 20–45%, or preferably 25–40%. Specifically, it is preferred that the aqueous solution contain the organic solvent and polyhydric alcohol at a high total concentration of 30–70 wt %, and preferably 40–60 wt %. At greater than 70 wt %, coagulation may become too slow resulting in poor spinnability, and at lower than 30 wt % the porous layer tends to become dense, often resulting in inferior ability to remove $\beta_2$-MG, etc.

According to the invention, after the aforementioned spinning solution and core material are ejected from the nozzle, they are preferably first passed through a gas region for 0.0001–0.02 minute before being immersed in the coagulating solution for coagulation.

By passage through the gas zone, coagulation of the inner layer section of the hollow fibers proceeds more rapidly than the outer layer section, forming a thin dense layer which determines the substance separating and permeation properties of the inner side, and forming a porous layer serving as the support layer on the outer side which provides the mechanical properties of the membrane, to thus obtain hollow fibers with high-performance with regard to selective permeability.

If the time is shorter than 0.0001 minute, a dense layer may be generated on the outer layer as well, thus reducing the ability to remove medium high molecular weight proteins such as $\beta_2$-MG. Conversely, if it is longer than 0.02 minute, the inner layer densification may proceed excessively, resulting in an overly thick dense layer and making it impossible to obtain a membrane with the desired high-performance of selective permeability.

The composition (wt) of a typical spinning solution may be selected in the range of cellulose derivative/solvent/non-solvent=5–18/55–75/10–38, preferably 10–15/58–72/13–30, and more preferably 11–14/60–70/17–21, with the total of the components being 100.

The compositional weight ratio of a typical coagulating bath may be selected in the range of solvent/non-solvent/water=30–60/15–30/30–65, and preferably 35–45/15–20/40–60, with the total of the components being 100.

The compositional weight ratio of the core material may be selected in the range of solvent/non-solvent/water=5–25/2–15/70–95, and preferably 10–20/3–10/80–90, with the total of the components being 100.

The spinning solution and the core material may preferably be ejected through air with a nozzle temperature of 30–100° C., preferably 40–60° C., and then introduced into a coagulating bath at 20–60° C., and preferably 30–50° C.

The hollow fibers coagulated in this manner may usually be washed with hot water, and then subjected to a process of glycerin adhesion treatment and winding. For assembly into the form of a dialyzer, the hollow fiber membrane obtained in this manner is dried and bundled for insertion to fill a cylindrical container, and both ends are sealed fast with urethane.

The selectively permeable hollow fiber membrane obtained in this manner according to the invention may then be subjected to high-pressure steam sterilization. The conditions are usually a temperature of 100–130° C., preferably 115–125° C., under a steam atmosphere, with treatment for 10 minutes to 1 hour. The pressure is determined as desired based on the temperature and atmosphere.

This process results in moderate densification of the structure of the hollow fiber membrane, and about a 40–80% reduction in the ultrafiltration rate for water, a 30–60% reduction in the permeation coefficient for dextran (molecular weight: 10,000) and a 50–70% reduction in the sieving coefficient for albumin.

After this moderate densification has occurred, i.e. after heat sterilization, it is possible to obtain a useful hollow fiber membrane which is a high-performance membrane having an ultrafiltration rate of at least 100 ml/mmHg·hr·m² for water at 37° C., a permeability coefficient of at least 4.0× $10^{-5}$ cm/sec for a 0.1 wt % aqueous solution of dextran (molecular weight: 10,000) and a sieving coefficient of 0.03 or lower for albumin using bovine plasma, as well as the ability to remove low molecular weight proteins such as $\beta_2$-microglobulin, one of the causative substances complications associated with blood dialysis.

The present invention will now be explained in more detail by way of the following examples which, however, are not intended to be restrictive on the invention in any way. In the examples, all "parts" are by weight.

EXAMPLES 1–8

Spinning solutions comprising 13 parts of cellulose triacetate and 20 parts of triethylene glycol uniformly dissolved in 67 parts of dimethylsulfoxide were ejected into air from a tube-in-orifice type nozzle using an aqueous solution of dimethylsulfoxide as the core material, after which they were fed through a coagulating solution and solidified, washed with water, subjected to glycerin adhesion treatment, and then wound. Each of the resulting hollow fiber membranes was then dried and bundled, for insertion to fill a cylindrical container, and both ends were sealed fast with polyurethane to prepare a blood dialyzer with an effective area of 1.5 m², upon which measurement was made of the in vitro ultrafiltration rate (UFR), measured with purified water the overall mass transfer coefficient ($K_0$) for dextran 10,000 and the sieving coefficient (SC) for albumin using bovine plasma. Meanwhile, a 0.05% solution of $\beta_2$-MG in bovine plasma was used for about 4 hours of blood dialysis with a flow of 200 ml/min on the blood side and a dialyzing solution flow of 500 ml/min.

After calculating the $\beta_2$-MG extraction ratio before and after dialysis, i.e.

{(blood level before dialysis–blood level after dialysis)/blood level before dialysis}×100(%)

compensation was made for the $\beta_2$-MG concentrating effect by water drainage.

The UFR reduction rate just after the start of dialysis and just before completion of the 4 hours was calculated as follows:

{(UFR immediately after start of dialysis–UFR immediately before completion of dialysis)/UFR immediately after start of dialysis}×100(%)

After completion of the dialysis, the amount of albumin in the total dialysate was measured and recorded as the albumin leakage.

Table 1 shows the spinning conditions and the in vitro characteristic values and dialysis performance. The hollow fibers of the invention had a high $\beta_2$-MG extraction ratio and low variation in the UFR over time as well as low leakage of albumin into the dialysate.

TABLE 1

|  | Water in core material (%) | Air transit time (sec) | Coagulation bath temperature (° C.) | UFR ml/mmHg · hr · m² | $K_0$ for dextran 10,000 (cm/sec) | SC for albumin | Extraction ratio for $\beta_2$-MG (%) | UFR reduction rate (%) | Albumin leakage (mg) |
|---|---|---|---|---|---|---|---|---|---|
| Ex. 1 | 90 | 0.1 | 40 | 250 | 7.1 × $10^{-5}$ | 0.005 | 53 | 11 | 430 |
| Ex. 2 | 80 | 0.1 | 40 | 330 | 7.6 × $10^{-5}$ | 0.008 | 58 | 13 | 560 |
| Ex. 3 | 70 | 0.1 | 40 | 410 | 8.5 × $10^{-5}$ | 0.012 | 61 | 16 | 710 |
| Ex. 4 | 80 | 0.08 | 40 | 340 | 7.7 × $10^{-5}$ | 0.009 | 55 | 14 | 600 |
| Ex. 5 | 80 | 0.3 | 40 | 280 | 7.3 × $10^{-5}$ | 0.007 | 54 | 13 | 480 |
| Ex. 6 | 80 | 0.8 | 40 | 220 | 6.9 × $10^{-5}$ | 0.005 | 50 | 10 | 450 |
| Ex. 7 | 80 | 0.1 | 30 | 300 | 7.5 × $10^{-5}$ | 0.007 | 55 | 12 | 410 |
| Ex. 8 | 80 | 0.1 | 50 | 480 | 8.5 × $10^{-5}$ | 0.015 | 62 | 15 | 830 |

EXAMPLES 9–13

Spinning solutions comprising 13 parts of cellulose triacetate and 20 parts of triethylene glycol uniformly dissolved in 67 parts of dimethylsulfoxide were ejected into air (about 5 cm) from a tube-in-orifice type nozzle using aqueous solutions of dimethylsulfoxide/triethylene glycol= 67/20 (wt/wt) as the core material (see Table 2), after which they were fed through a coagulating solution (50 wt % aqueous solution of dimethylsulfoxide/triethylene glycol= 67/20 (wt/wt)) at the temperatures listed in Table 2 and solidified, washed with water, subjected to glycerin adhesion treatment, and then wound. The spinning rate was 30 m/min. Each of the resulting hollow fiber membranes was then dried and bundled, inserted to fill a cylindrical container, and both ends were sealed fast with polyurethane to prepare a hollow fiber membrane dialyzer with an effective area of about 1.5 $m^2$, upon which measurement was made of the in vitro ultrafiltration rate (UFR), the overall mass transfer coefficient ($K_0$) for dextran 10,000 and the sieving coefficient (SC) for albumin using bovine plasma.

Comparative Example 1

A spinning solution comprising 20 parts of cellulose triacetate and 23 parts of propylene glycol uniformly dissolved in 57 parts of N-methylpyrrolidone was ejected into air from a double-barrel nozzle using liquid paraffin as the core material, after which it was fed through a coagulating bath at 25° C. consisting of a mixture of water, propylene glycol and N-methylpyrrolidone in a weight ratio of 80:6:14 and solidified, washed with water, subjected to glycerin adhesion treatment, and then wound. The core of the resulting hollow fiber membrane was taken out, and after washing with water, the hollow fiber membrane was inserted and filled into a cylindrical container, and then dried and sealed fast at both ends with polyurethane to prepare a blood dialyzer with an effective area of about 1.5 $m^2$, which was then subjected to a performance evaluation by blood filtration.

The results are shown in Table 2

Comparative Example 1 is a uniform membrane according to the prior art, which has low permeability for dextran (molecular weight: 10,000).

EXAMPLES 14–18

Spinning solutions comprising 13 parts of cellulose triacetate and 20 parts of triethylene glycol uniformly dissolved in 67 parts of dimethylsulfoxide were ejected into air (about 5 cm) from a double-barrel nozzle using an 80 wt % aqueous solution of dimethylsulfoxide/triethylene glycol= 37/13 (wt/wt) as the core material, after which they were fed through a coagulating solution (50 wt % aqueous solution of dimethylsulfoxide/triethylene glycol=37/13 (wt/wt)) and solidified, washed with water, subjected to glycerin adhesion treatment, and then wound. The spinning rate was 30 m/min. Each of the resulting hollow fiber membranes was then dried and bundled, inserted to fill a cylindrical container, and both ends were sealed fast with polyurethane to prepare a hollow fiber membrane dialyzer with an effective area of about 1.5 $m^2$, which was subjected to a performance evaluation by blood filtration. The results are shown in Table 3.

Comparative Example 2

A spinning solution comprising 20 parts of cellulose triacetate and 23 parts of propylene glycol uniformly dissolved in 57 parts of N-methylpyrrolidone was ejected into air from a tube-in-orifice type nozzle using liquid paraffin as the core material, after which it was fed through a coagulating bath at 25° C. consisting of a mixture of water, propylene glycol and N-methylpyrrolidone in a weight ratio of 80:8:12 and solidified, washed with water, subjected to glycerin adhesion treatment, and then wound. The core of the resulting hollow fiber membrane was taken out, and after washing with water, the hollow fiber membrane was inserted and filled into a cylindrical container, and then dried and sealed fast at both ends with polyurethane to prepare a blood

TABLE 2

|  | Water in core material (%) | Coagulation bath temperature (° C.) | Noggle temp. (° C.) | Dense layer thickness ($\mu$m) | Dense layer void (%) | UFR ml/mmHg · hr · $m^2$ | $K_0$ for urea (cm/sec) | $K_0$ for dextran 10,000 (cm/sec) | SC for albumin |
|---|---|---|---|---|---|---|---|---|---|
| Ex. 9 | 80 | 45 | 45 | 0.6 | 18 | 542 | $92 \times 10^{-5}$ | $12.8 \times 10^{-5}$ | 0.008 |
| Ex. 10 | 75 | 40 | 40 | 0.8 | 10 | 293 | $139 \times 10^{-5}$ | $8.8 \times 10^{-5}$ | 0.006 |
| Ex. 11 | 80 | 40 | 40 | 1.0 | 13 | 371 | $98 \times 10^{-5}$ | $11.1 \times 10^{-5}$ | 0.007 |
| Ex. 12 | 85 | 40 | 35 | 0.8 | 8 | 207 | $83 \times 10^{-5}$ | $6.4 \times 10^{-5}$ | 0.004 |
| Ex. 13 | 70 | 45 | 50 | 1.5 | 26 | 709 | $83 \times 10^{-5}$ | $13.9 \times 10^{-5}$ | 0.01 |
| Comp. Ex. 1 | — | 30 | 120 | 15 uniform membrane | 65 | 173 | $128 \times 10^{-5}$ | $6.1 \times 10^{-5}$ | 0.01 |

Figure 2:
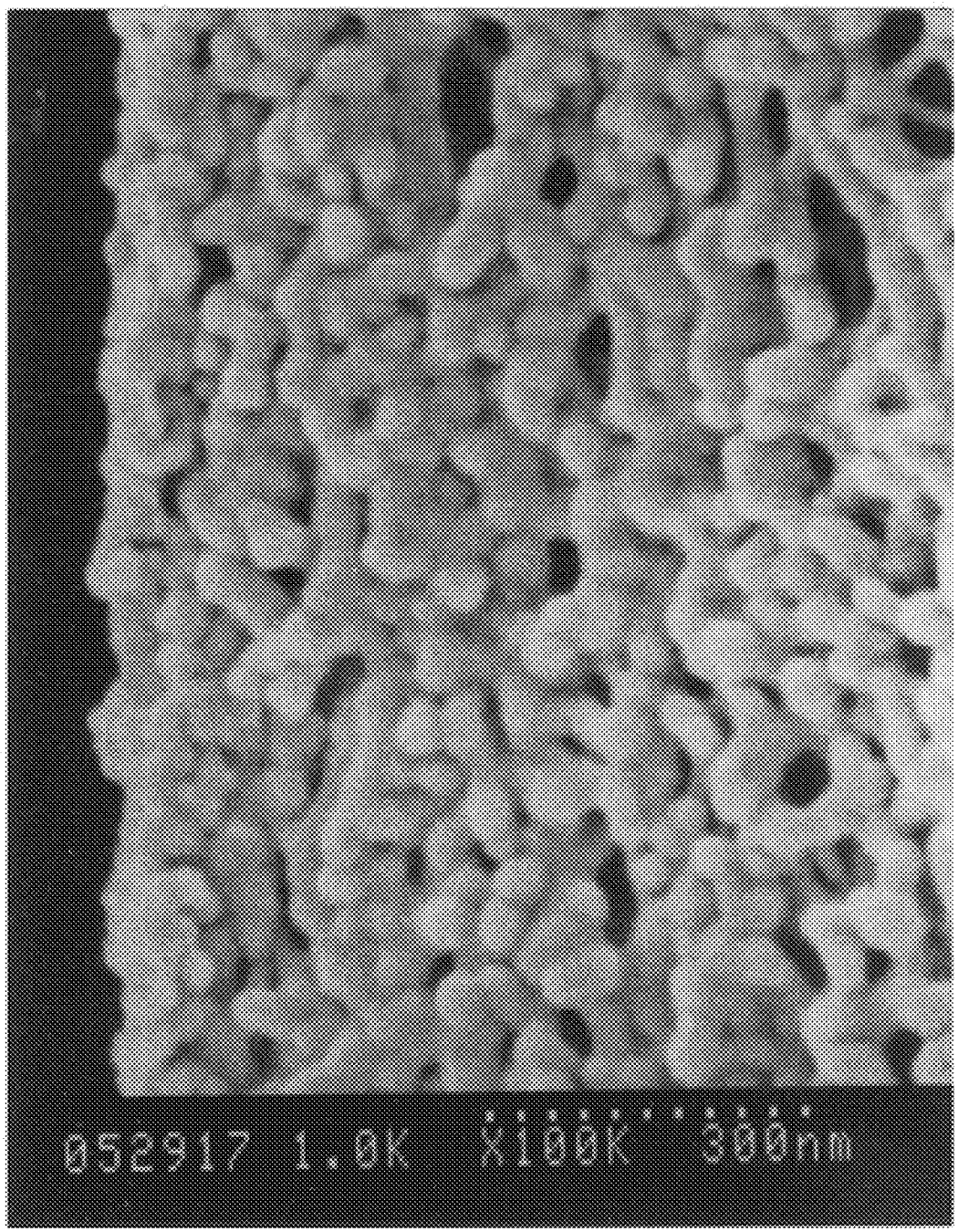
FIG. 2 is an electron micrograph (100,000×) showing a cross-section of the dense layer of the hollow fiber membrane shown in FIG. 1.

Electron micrographs of cross-sections of the hollow fiber membrane of Example 9 are shown in FIGS. 1 and 2. It has an ultrathin dense layer of less than 2 $\mu$m on the inner side, and the void percentage of the dense layer is 18(%). High permeability is evidenced by a purified water ultrafiltration coefficient of 542, an overall mass transfer coefficient ($K_0$) for dextran (molecular weight: 10,000) of $12.8 \times 10^{-5}$ (cm/sec) and an overall mass transfer coefficient ($K_0$) for urea of $92 \times 10^{-5}$ (cm/sec). Also, the SC for albumin was 0.008, demonstrating excellent albumin cutoff performance. Examples 2–5 show excellent performance in both the permeability for dextran (molecular weight: 10,000) and low molecular weight urea, and albumin SC of 0.01 or lower.

dialyzer with an effective area of about 1.5 $m^2$, which was then subjected to a performance evaluation by blood filtration.

The results are shown in Table 3.

TABLE 3

| Parameter | Ex. 14 | Ex. 15 | Ex. 16 | Ex. 17 | Ex. 18 | Comp. Ex. 2 |
|---|---|---|---|---|---|---|
| Coagulation bath temp. (°C.) | 60 | 45 | 60 | 45 | 45 | 30 |
| Water in core material (wt %) | 85 | 80 | 85 | 80 | 80 | 0 liquid paraffin |

TABLE 3-continued

| Parameter | | Ex. 14 | Ex. 15 | Ex. 16 | Ex. 17 | Ex. 18 | Comp. Ex. 2 |
|---|---|---|---|---|---|---|---|
| Nozzle temp. (°C.) | | 50 | 45 | 50 | 45 | 45 | 120 |
| Polymer concentration (wt %) | | 14 | 12 | 13 | 12 | 12 | 20 |
| Hollow fiber inner diameter ($\mu$m) | | 150 | 200 | 198 | 200 | 200 | 198 |
| Hollow fiber membrane thickness ($\mu$m) | | 30 | 40 | 58 | 40 | 40 | 18 |
| Porosity (%) | | 58 | 80 | 71 | 80 | 80 | 68 |
| Purified water ultrafiltration rate (ml/mmHg · hr · m$^2$) | | 205.2 | 812.4 | 518.6 | 820.1 | 820.4 | 151.3 |
| Ultrafiltration speed (ml/min) | | 10 | 10 | 10 | 20 | 40 | 10 |
| Blood ultra- filtration rate (ml/mmHg · hr · m$^2$) | After 15 mins | 43.8 | 72.6 | 61.8 | 68.1 | 68.7 | 28.1 |
| | After 4 hrs | 38.1 | 70.4 | 56.9 | 63.3 | 59.8 | 19.1 |
| Retention (%) | | 86.8 | 96.6 | 92.0 | 93.1 | 87.0 | 68.2 |
| $\beta_2$-MG sieving coefficient | After 15 mins | 0.56 | 0.81 | 0.69 | 0.76 | 0.73 | 0.58 |
| | After 4 hrs | 0.49 | 0.79 | 0.63 | 0.69 | 0.65 | 0.42 |
| Retention (%) | | 86.9 | 97.5 | 91.3 | 90.8 | 89.7 | 72.4 |

In Examples 14–16, the membranes each had a 2-layer structure comprising an approximately 1 $\mu$m ultrathin dense layer on the inner side and a porous support layer, with purified water ultrafiltration rates in a range of 205.2–812.4 ml/mmHg·hr·m$^2$, and blood ultrafiltration rate and $\beta_2$-MG sieving coefficient retentions of 80% or greater, demonstrating very low deterioration of the hollow fiber membrane filtration performance.

In Examples 17 and 18, the blood ultrafiltration rate and $\beta_2$-MG sieving coefficient retentions were 80% or greater even when the ultrafiltration speeds increased from 10 ml/min to 20 and 40 ml/min, demonstrating very low deterioration of the hollow fiber membrane filtration performance.

Comparative Example 2 gives the blood ultrafiltration rate and $\beta_2$-MG sieving coefficient retentions for hollow fibers having a uniform dense membrane structure according to the prior art, using liquid paraffin as the core material, but filtration coefficient retentions for blood filtration showed a large reduction of 68.2%.

Figure 4:
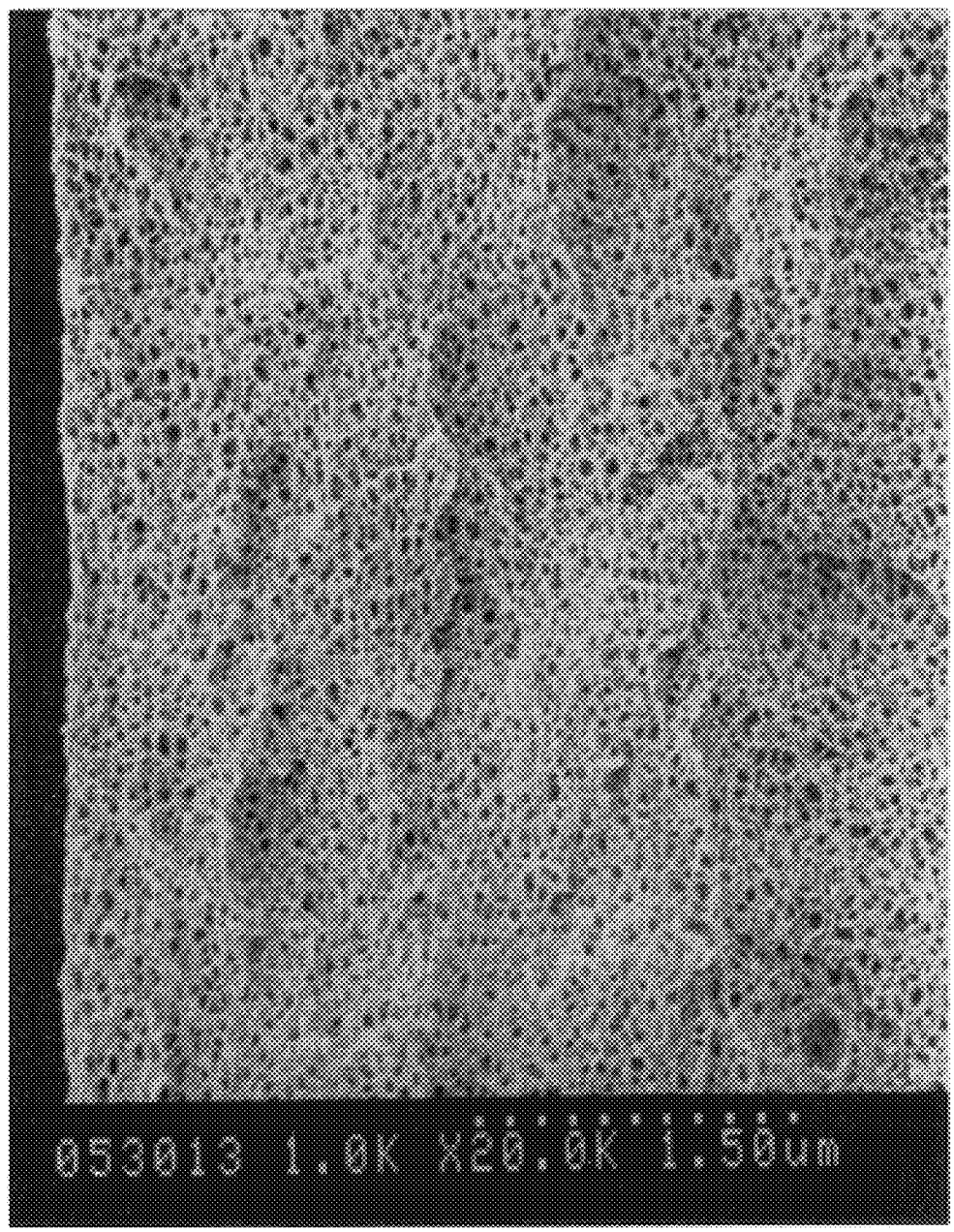
FIG. 4 is an electron micrograph (20,000×) showing a cross-section of a hollow fiber membrane obtained in a comparative example.

An electron micrograph of a cross-section of the hollow fiber membrane of Comparative Example 2 is shown in FIG. 4.

EXAMPLES 19–21

Spinning solutions consisting of dissolved systems comprising cellulose triacetate (acetylation: 60.5, polymerization degree: 360, product of Dicell Chemical Industries, KK.), N-methylpyrrolidone (NMP) as a solvent and propylene glycol (PG) as a non-solvent polyhydric alcohol mixed in the proportions listed in Table 4, were ejected from a double-barrel nozzle using aqueous solutions with the NMP and PG compositions listed in Table 4 as the core solution, and were then passed through air for the distances listed in Table 4, after which they were fed through a coagulating solution, solidified, washed with water, subjected to glycerin adhesion treatment, and then wound. Each of the resulting hollow fiber membranes was then dried and inserted into a cylindrical container, and both ends were sealed fast with polyurethane to prepare a hollow fiber membrane dialyzer with an effective area of about 1.5 m$^2$ The purified water ultrafiltration rate (UFR), the $\beta_2$-MG sieving coefficient and the albumin sieving coefficient were measured in vitro. The results are shown in Table 4.

TABLE 4

| Parameter | | Example 19 | Example 20 | Example 21 |
|---|---|---|---|---|
| Spinning solution | cellulose triacetate (wt %) | 13 | ← | 15 |
| | NMP (wt %) | 68 | ← | 67 |
| | PG (wt %) | 19 | ← | 18 |
| Core material | NMP (wt %) | 12 | ← | 16 |
| | PG (wt %) | 3 | ← | 4 |
| | water (wt %) | 85 | ← | 80 |
| Coagulating solution | NMP (wt %) | 39 | ← | ← |
| | PG (wt %) | 11 | ← | ← |
| | water (wt %) | 50 | ← | ← |
| Spinning rate (m/min) | | 30 | ← | ← |
| Air gap (mm) | | 30 | 100 | 15 |
| Air transit time (min) | | 0.001 | 0.0033 | 0.0005 |
| Hollow fibers | inner diameter ($\mu$m) | 200 | ← | ← |
| | membrane thickness ($\mu$m) | 40 | ← | 38 |
| | porosity (%) | 80 | 75 | 68 |
| Performance | UFR (ml/mmHg · hr · m$^2$) | 680 | 580 | 450 |
| | SC$_{\beta2\text{-MG}}$ | 0.81 | 0.70 | 0.65 |
| | SC$_{\text{albumin}}$ | 0.01 | 0.01 | 0.01 |

("←"signifies "same as left ")

EXAMPLE 22

A spinning solution comprising 13 parts of cellulose triacetate and 20 parts of propylene glycol uniformly dissolved in 67 parts of N-methylpyrrolidone was ejected into air from a tube-in-orifice type nozzle using an aqueous solution of N-methylpyrrolidone as the core material, after which it was fed through a coagulating solution and solidified, washed with water, subjected to glycerin adhesion treatment, and then wound. The inner diameter of the resulting hollow fibers was 200 $\mu$m, the membrane thickness was 35 $\mu$m, the porosity was 80%, and the breaking strength was 30 g. After drying the resulting hollow fiber membrane, it was bundled, inserted to fill a cylindrical container, and both ends were sealed fast with polyurethane to prepare a blood dialyzer with an effective area of about 1.5 m$^2$. The UFR of the dialyzer was 500 ml/mmHg·hr·m$^2$.

EXAMPLES 23–28

Spinning solutions comprising cellulose triacetate and triethylene glycol uniformly dissolved in dimethylsulfoxide (DMSO) (triethylene glycol/DMSO=2/7 (wt/wt)) were ejected into air from a tube-in-orifice type nozzle using different fluids as the core materials, after which they were fed through a coagulating solution and solidified, washed with water, subjected to glycerin adhesion treatment, and then wound. Each of the resulting hollow fiber membranes was dried and bundled, inserted to fill a cylindrical container, and both ends were sealed fast with polyurethane to prepare a blood dialyzer with an effective area of about 1.5 m$^2$.

Table 5 shows the spinning conditions and the in vitro characteristic values and dialysis performance. The hollow fibers of the invention had a low sieving coefficient for albumin and high dialyzing performance for $\beta_2$-microglobulin in plasma systems.

The $SC_{Alb}/SC_{DX}$ ratio shown in Table 5 is as mentioned herein-before.

TABLE 5

|   | Triacetate concentration of spinning solution (%) | Core material | Spinning temperature (° C.) | Membrane thickness ($\mu$m) | $SC_{DX}$ | $SC_{Alb}$ | $SC_{Alb}/SC_{DX}$ | $CL_{\beta 2-MG}$ (ml/min) |
|---|---|---|---|---|---|---|---|---|
| Ex. 23 | 13 | DMSO aqueous solution (10%) | 45 | 40 | 0.20 | 0.015 | 0.075 | 62 |
| Ex. 24 | 13 | DMSO aqueous solution (30%) | 45 | 40 | 0.23 | 0.022 | 0.096 | 68 |
| Ex. 25 | 13 | DMSO aqueous solution (10%) | 55 | 40 | 0.28 | 0.025 | 0.089 | 73 |
| Ex. 26 | 13 | DMSO aqueous solution (10%) | 60 | 40 | 0.35 | 0.031 | 0.089 | 77 |
| Ex. 27 | 14 | DMSO aqueous solution (10%) | 45 | 40 | 0.15 | 0.008 | 0.053 | 52 |
| Ex. 28 | 15 | DMSO aqueous solution (10%) | 45 | 40 | 0.11 | 0.005 | 0.045 | 45 |

(% = wt %)

EXAMPLES 29–31

Spinning solutions consisting of dissolved systems comprising cellulose triacetate (acetylation: 60.5, polymerization degree: 360, product of Dicell Chemical Industries, KK.), N-methylpyrrolidone (NMP) as a solvent and propylene glycol (PG) as a non-solvent polyhydric alcohol mixed in the proportions listed in Table 6, were ejected from a tube-in-orifice type using aqueous solutions with the NMP and PG compositions listed in Table 6 as the core solution, and were then passed through air for the distances listed in Table 6, after which they were fed through a coagulating solution, solidified, washed with water, subjected to glycerin adhesion treatment, and then wound. Each of the resulting hollow fiber membranes was then dried and inserted into a cylindrical container, and both ends were sealed fast with polyurethane to prepare a hollow fiber membrane dialyzer with an effective area of about 1.5 m². The purified water ultrafiltration rate (UFR), the $\beta_2$-MG sieving coefficient and the albumin sieving coefficient were measured in vitro. The results are shown in Table 6.

TABLE 6

| Parameter | | Example 29 | Example 30 | Example 31 |
|---|---|---|---|---|
| Spinning solution | cellulose triacetate (wt %) | 13 | 12 | 15 |
| | NMP (wt %) | 68 | 69 | 66.5 |
| | PG (wt %) | 19 | 19 | 18.5 |
| Core material | NMP (wt %) | 12 | 8 | 16 |
| | PG (wt %) | 3 | 2 | 4 |
| | water (wt %) | 85 | 90 | 80 |
| Gas phase distance (cm) | | 3 | 3 | 3 |
| Coagulating solution | NMP (wt %) | 39 | 26 | 36 |
| | PG (wt %) | 11 | 14 | 19 |
| | water (wt %) | 50 | 60 | 45 |
| Hollow fibers | inner diameter ($\mu$m) | 200 | 200 | 200 |
| | membrane thickness ($\mu$m) | 40 | 38 | 40 |
| | porosity (%) | 80 | 84 | 70 |
| Performance | UFR (ml/mmHg · hr · m²) | 680 | 630 | 550 |

TABLE 6-continued

| Parameter | Example 29 | Example 30 | Example 31 |
|---|---|---|---|
| $SC_{\beta 2-MG}$ | 0.81 | 0.75 | 0.70 |
| $SC_{albumin}$ | 0.01 | 0.01 | 0.01 |

EXAMPLES 32 and 33

Hollow fiber membrane dialyzers were prepared by the same procedure as Example 29, except for using dimethylsulfoxide (DMSO) as the solvent and triethylene glycol as the non-solvent polyhydric alcohol.

The results are shown in Table 7.

TABLE 7

| Parameter | | Example 32 | Example 33 |
|---|---|---|---|
| Spinning solution | cellulose triacetate (wt %) | 13 | 12 |
| | DMSO (wt %) | 67 | 68 |
| | TEG (wt %) | 20 | 20 |
| Core material | DMSO (wt %) | 20 | 12 |
| | TEG (wt %) | 0 | 3 |
| | water (wt %) | 80 | 85 |
| Gas phase distance (cm) | | 3 | 3 |
| Coagulating solution | DMSO (wt %) | 37 | 39 |
| | TEG (wt %) | 0 | 3 |
| | water (wt %) | 50 | 50 |
| Hollow fibers | inner diameter ($\mu$m) | 200 | 200 |
| | membrane thickness ($\mu$m) | 40 | 40 |
| | porosity (%) | 80 | 83 |
| Performance | UFR (ml/mmHg · hr · m²) | 700 | 720 |
| | $SC_{\beta 2-MG}$ | 0.80 | 0.82 |
| | $SC_{albumin}$ | 0.01 | 0.01 |

EXAMPLES 34–37

Spinning solutions comprising 13 parts of cellulose triacetate and 20 parts of triethylene glycol uniformly dissolved in 67 parts of dimethylsulfoxide were ejected into air from a tube-in-orifice type nozzle using an aqueous solution of dimethylsulfoxide as the core material, after which they were fed through a coagulating solution and solidified, washed with water, subjected to glycerin adhesion treatment, and then wound. The resulting hollow fibers had an inner diameter of about 200 µm and a membrane thickness of about 45 µm. Each of the resulting hollow fiber membranes was then dried and bundled, inserted to fill a cylindrical container, and both ends were sealed fast with polyurethane to prepare a blood dialyzer with an effective area of about 1.5 m², upon which in vitro measurement was made of the overall mass transfer coefficient ($K_O$) for dextran 10,000 and the sieving coefficient (SC) for albumin using bovine plasma. The results are shown in Table 8.

TABLE 8

| | DMSO concentration of core material (%) | Outer diameter of annular slit [mmΦ] | Spinning draft [−] | Spinning breakage [times/hr] | $K_O$ (DX10000) [cm/sec] | SC (Alb) [−] |
|---|---|---|---|---|---|---|
| Ex. 34 | 20 | 0.35 | 1.5 | 0 | $10.4 \times 10^{-5}$ | 0.010 |
| Ex. 35 | 30 | 0.35 | 1.5 | 0 | $11.5 \times 10^{-5}$ | 0.016 |
| Ex. 36 | 20 | 0.40 | 2.0 | 0 | $9.8 \times 10^{-5}$ | 0.008 |
| Ex. 37 | 30 | 0.40 | 2.0 | 0 | $11.6 \times 10^{-5}$ | 0.010 |

Table 8 shows the spinning conditions, spinning behavior and the in vitro performance. The process for producing hollow fibers according to the invention allowed stable production with good spinning behavior of the selectively permeable hollow fiber membranes, and with a large $K_O$ for dextran 10,000, a small albumin sieving coefficient, and satisfactory fractionating properties.

EXAMPLES 38–45

Spinning solutions comprising 13 parts of cellulose triacetate and 20 parts of propylene glycol uniformly dissolved in 67 parts of N-methylpyrrolidone were ejected into air from a tube-in-orifice type nozzle using an aqueous solution of N-methylpyrrolidone as the core material, after which they were fed through a coagulating solution and solidified, washed with water, subjected to glycerin adhesion treatment, and then wound. Each of the resulting hollow fiber membranes was then dried and bundled, inserted to fill a cylindrical container, and both ends were sealed fast with polyurethane to prepare a blood dialyzer with an effective area of about 1.5 m², upon which the UFR, $K_O$ for $\beta_2$-MG and the SC for albumin were measured in vitro using bovine plasma. Also, a 0.05% solution of $\beta_2$-MG in bovine plasma was used for about 2 hours of blood dialysis with a flow of 200 ml/min on the blood side and a dialyzing solution flow of 500 ml/min.

After calculating the $\beta_2$-MG extraction ratio before and after dialysis, compensation was made for the $\beta_2$-MG concentrating effect by water drainage.

The UFR reduction rate just after the start of dialysis and just before completion of the 2 hours was calculated. After completion of the dialysis, the amount of albumin in the total dialysate was measured and recorded as the albumin leakage.

Table 9 shows the spinning conditions and the in vitro characteristic values and dialysis performance. The hollow fibers of the invention had a high $\beta_2$-MG extraction ratio and low variation in the UFR over time as well as low leakage of albumin into the dialysate.

TABLE 9

| | Water in core material (%) | Nozzle temp. (° C.) | Air transit time (sec) | UFR ml/mmHg · hr · m² | $K_O$ for $\beta_2$-MG (cm/sec) | SC for albumin | Extraction ratio for $\beta_2$-MG (%) | UFR reduction rate (%) | Albumin leakage (mg) |
|---|---|---|---|---|---|---|---|---|---|
| Ex. 38 | 90 | 50 | 0.1 | 30 | $6.9 \times 10^{-5}$ | 0.010 | 33 | 11 | 220 |
| Ex. 39 | 80 | 50 | 0.1 | 36 | $7.6 \times 10^{-5}$ | 0.018 | 38 | 14 | 280 |
| Ex. 40 | 70 | 50 | 0.1 | 38 | $8.5 \times 10^{-5}$ | 0.027 | 40 | 18 | 360 |
| Ex. 41 | 80 | 50 | 0.08 | 36 | $7.7 \times 10^{-5}$ | 0.019 | 36 | 14 | 300 |
| Ex. 42 | 80 | 50 | 0.3 | 36 | $7.3 \times 10^{-5}$ | 0.017 | 34 | 12 | 240 |
| Ex. 43 | 80 | 50 | 0.5 | 35 | $6.6 \times 10^{-5}$ | 0.012 | 30 | 12 | 210 |
| Ex. 44 | 80 | 45 | 0.1 | 27 | $6.5 \times 10^{-5}$ | 0.012 | 35 | 12 | 210 |
| Ex. 45 | 80 | 55 | 0.1 | 45 | $8.5 \times 10^{-5}$ | 0.025 | 42 | 17 | 450 |

EXAMPLES 46–49

Spinning solutions comprising 13 parts of cellulose triacetate and 20 parts of triethylene glycol uniformly dissolved in 67 parts of dimethylsulfoxide were ejected into air from a tube-in-orifice type nozzle using an aqueous solution of dimethylsulfoxide as the core material, after which they were fed through a coagulating solution and solidified, washed with water, subjected to glycerin adhesion treatment, and then wound. Each of the resulting hollow fiber membranes was then dried and bundled, inserted to fill a cylindrical container, and both ends were sealed fast with polyurethane to prepare a blood dialyzer with an effective area of about 1.5 m², upon which in vitro measurement was made of the ultrafiltration rate (UFR), the overall mass transfer coefficient ($K_O$) for dextran 10,000 and the sieving coefficient (SC) for albumin using bovine plasma.

TABLE 10

| | Nozzle temp (°C.) | Water content of core material (%) | Porosity (%) | UFR (ml/mmHg·hr·m$^2$) | $K_O$ (DX10000) [cm/sec] | SC (Alb) [–] |
|---|---|---|---|---|---|---|
| Ex. 46 | 50 | 80 | 80 | 950 | $11.5 \times 10^{-5}$ | 0.015 |
| Ex. 47 | 50 | 90 | 78 | 830 | $10.4 \times 10^{-5}$ | 0.010 |
| Ex. 48 | 40 | 80 | 76 | 760 | $9.3 \times 10^{-5}$ | 0.008 |
| Ex. 49 | 60 | 80 | 82 | 1130 | $13.8 \times 10^{-5}$ | 0.023 |

Table 10 shows the spinning conditions and the in vitro characteristic values and evaluated parameters for Examples 46–49.

The hollow fibers of the invention had satisfactory molecular weight fractionating properties, including high drainage performance and dextran 10,000 permeability, with minimized permeation of albumin.

EXAMPLES 50–52

Figure 3:
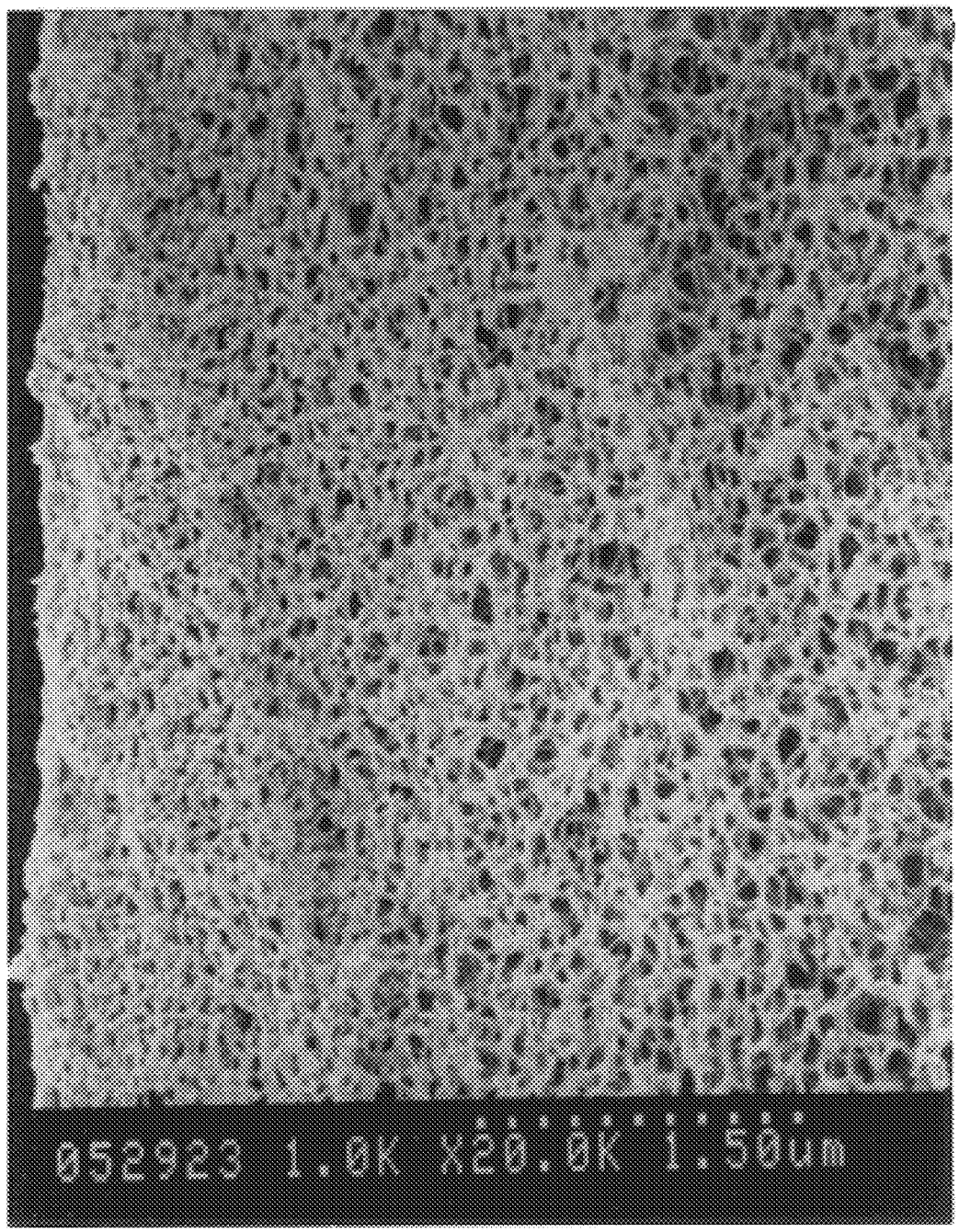
FIG. 3 is an electron micrograph (20,000×) showing a cross-section of a hollow fiber membrane obtained in another example (including the dense layer and the porous layer).

Spinning solutions comprising 13 parts of cellulose triacetate and 20 parts of triethylene glycol uniformly dissolved in 67 parts of dimethylsulfoxide were ejected into air from a tube-in-orifice type nozzle using an aqueous solution of dimethylsulfoxide/triethylene glycol as the core material, after which they were fed through a coagulating solution (aqueous solution of dimethylsulfoxide/triethylene glycol) and solidified, washed with water, subjected to glycerin adhesion treatment, and then wound. Each of the resulting hollow fiber membranes was then dried and bundled, inserted to fill a cylindrical container, and both ends were sealed fast with polyurethane to prepare a preliminary membrane blood dialyzer with an effective area of about 1.5 m$^2$, which was then treated in a water vapor atmosphere at 121° C. for 20 minutes to obtain a blood dialyzer according to the invention, and finally each of the dialyzers was subjected to in vitro measurement of the ultrafiltration rate (UFR), the overall mass transfer coefficient ($K_O$) for dextran 10,000 and the sieving coefficient (SC) for albumin using bovine plasma. The results are shown in Table 11.

of 0.26, thus giving an albumin cutoff providing excellent permeation performance. An electron micrograph of a cross-section of the hollow fiber membrane of Example 50 is shown in FIG. 3.

In Examples 51 and 52, the ultrafiltration rate for water, the SC for albumin and the $K_O$ for dextran 10,000 were even further increased for the preliminary membrane prior to high pressure steam sterilization, to obtain hollow fibers with both excellent permeation performance and fractionating properties after high pressure steam sterilization. The membrane structure, as shown in the electron micrograph of Example 1, included a dense layer of about 0.6 μm on the inner side, and the hollow fiber membrane was asymmetrical with a spongy phase separation structure across the inner and outer layers.

EXAMPLES 53–55

Spinning solutions comprising 13 parts of cellulose triacetate and 20 parts of triethylene glycol uniformly dissolved in 67 parts of dimethylsulfoxide were ejected into air from a double barrel nozzle using an aqueous solution of dimethylsulfoxide/triethylene glycol as the core material, after which they were fed through a coagulating solution (aqueous solution of dimethylsulfoxide/triethylene glycol) and solidified, washed with water, subjected to glycerin adhesion treatment, and then wound. Each of the resulting hollow fiber membranes was then dried and bundled, inserted to fill a cylindrical container, and both ends were sealed fast with polyurethane to prepare a blood dialyzer with an effective area of about 1.5 m$^2$, which was then treated in a water vapor atmosphere at 121° C. for 20 minutes to obtain a blood dialyzer, and finally each of the dialyzers was subjected to in vitro measurement of the ultrafiltration rate (UFR), the overall mass transfer coefficient ($K_O$) for dextran 10,000 and the sieving coefficient (SC) for albumin using bovine plasma. The results are shown in Table 12. Also, the results of measurements taken before heat treatment are shown in Table 13.

TABLE 11

| No. | Nozzle temp. (° C.) | Water content of core material (%) | Coagulating bath temp. (° C.) | Before high pressure steam sterilization | | | After high pressure steam sterilization | | |
|---|---|---|---|---|---|---|---|---|---|
| | | | | UFR (ml/mmHg·hr·m$^2$) | $K_O$ for dextran 10000 (cm/sec) | SC for albumin | UFR (ml/mmHg·hr·m$^2$) | $K_O$ for dextran 10000 (cm/sec) | SC for albumin |
| Ex. 50 | 60 | 65 | 40 | 830 | $1.20 \times 10^{-4}$ | 0.060 | 180 | $5.28 \times 10^{-5}$ | 0.026 |
| Ex. 51 | 50 | 65 | 40 | 810 | $1.06 \times 10^{-4}$ | 0.050 | 140 | $4.51 \times 10^{-5}$ | 0.021 |
| Ex. 52 | 60 | 60 | 40 | 900 | $1.29 \times 10^{-4}$ | 0.082 | 198 | $8.93 \times 10^{-5}$ | 0.027 |

As shown in Table 11, in Example 50 the membrane permeability of the preliminary membrane was increased for an ultrafiltration rate for water of at least 830 ml/mmHg·hr·m$^2$, an SC for albumin of 0.06 and a $K_O$ for dextran 10,000 of $12.0 \times 10^{-5}$ cm/sec, to obtain a hollow fiber membrane after high pressure steam sterilization with an ultrafiltration rate for water of 180 ml/mmHg·hr·m$^2$, a $K_O$ for dextran 10,000 of $5.28 \times 10^{-5}$ cm/sec, and an SC for albumin

TABLE 12

| No. | Nozzle temp (°C.) | Water content of core material (%) | Coagulating bath temp. (°C.) | Shrinkage of hollow fiber membrane under no tension (%) | Performance as dialyzer after high pressure vapor sterilization | | |
|---|---|---|---|---|---|---|---|
| | | | | | UFR (ml/mmHg · hr · m$^2$) | $K_0$ (DX 10000) (cm/sec) | SC (Alb) (−) |
| Ex. 53 | 60 | 85 | 40 | 6.2 | 510 | $7.6 \times 10^{-5}$ | 0.018 |
| Ex. 54 | 50 | 85 | 40 | 6.0 | 460 | $7.1 \times 10^{-5}$ | 0.015 |
| Ex. 55 | 60 | 80 | 40 | 6.3 | 530 | $7.8 \times 10{-5}$ | 0.020 |

TABLE 13

| | UFR (ml/mmHg · hr · m$^2$) | $K_0$ (DX10000) (cm/sec) | SC (Alb) (−) |
|---|---|---|---|
| Reference Example 1 | 890 | $15.7 \times 10^{-5}$ | 0.032 |
| Reference Example 2 | 820 | $13.8 \times 10^{-5}$ | 0.025 |
| Reference Example 3 | 940 | $16.3 \times 10^{-5}$ | 0.036 |

As shown in Table 12, in Examples 53–55 the shrinkage rate of the hollow fiber membranes after heat treatment at 121° C. for 20 minutes under no tension were under 7%, and when the hollow fiber membranes incorporated into blood dialyzers were subjected to high pressure steam sterilization there was no deformity in shape, while the performance as dialyzers demonstrated selective permeability, exhibiting permeability to substances in a wide molecular weight range from water to dextran 10,000 while also minimizing permeation of albumin.

Also, upon heat treatment for comparison with the membranes prior to heat treatment, the permeation performance for water, dextran 10,000 and albumin was poorer but sufficient performance was exhibited for substances of medium molecular weight from water to dextran 10,000, while from the standpoint of densification and shrinkage of the hollow fiber membranes due to the heat treatment, the selectively permeable hollow fiber membranes with shrinkage of under 7% sustained their performance as blood dialyzers.

We claim:

1. A selectively permeable hollow fiber membrane for blood dialysis consisting substantially of a cellulose derivative, which has at least a dense layer on the innermost side and a porous layer of greater void percentage on the outside, which has an ultrafiltration rate (UFR) of at least 50 ml/mmHg·hr·m$^2$ as measured with purified water at 37° C., which has an overall mass transfer coefficient ($K_0$) for dextran of at least $2.0 \times 10^{-5}$ cm/sec when measured using a 0.1 wt % aqueous solution of dextran of molecular weight 10,000 and a sieving coefficient for albumin ($SC_{Alb}$) of 0.1 or lower after one hour perfusion of bovine plasma, when the measurement is made with the hollow fiber membrane incorporated into a dialyzer.

2. A hollow fiber membrane according to claim 1, wherein said ultrafiltration rate (UFR) is at least 100 ml/mmHg·hr·m$^2$.

3. A hollow fiber membrane according to claim 1, wherein said overall mass transfer coefficient ($K_0$) for dextran is at least $4.0 \times 10^{-5}$ cm/sec.

4. A hollow fiber membrane according to claim 1, wherein said sieving coefficient for albumin ($SC_{Alb}$) is 0.04 or lower.

5. A hollow fiber membrane according to claim 1, wherein the sieving coefficient for dextran ($SC_{DX}$) is at least 0.05 when measured using a 0.1 wt % aqueous solution of dextran of molecular weight 70,000 and the $SC_{Alb}/SC_{DX}$ ratio is less than 0.12 for the sieving coefficient for albumin ($SC_{Alb}$) after one hour of perfusion of bovine plasma.

6. A hollow fiber membrane according to claim 1, wherein the ultrafiltration rate (UFR) is at least 25 ml/mmHg·hr·m$^2$ as measured with bovine plasma at 37° C., with an ultrafiltration rate retention of 70% or greater after 4 hours perfusion of bovine plasma.

7. A hollow fiber membrane according to claim 6, wherein said UFR retention is at least 80%.

8. A hollow fiber membrane according to claim 1, wherein the thickness of said dense layer is 0.2–2 μm, and the void percentage is 30% or lower.

9. A hollow fiber membrane according to claim 8, wherein the inner diameter of said hollow fiber membrane is 100–300 μm, the membrane thickness is 15–60 μm, and the breaking strength is at least 20 g.

10. A hollow fiber membrane according to claim 1, wherein said hollow fiber membrane has a dense layer on the outermost side.

11. A hollow fiber membrane according to claim 1, wherein the ultrafiltration rate (UFR) of said hollow fiber membrane at 37° C. upon 20 minute processing in 121° C. saturated steam under substantially zero tension is at least 100 ml/mmHg·hr·m$^2$, the overall mass transfer coefficient ($K_0$) for dextran is at least $4.0 \times 10^{-5}$ cm/sec when measured using a 0.1 wt % aqueous solution of dextran of molecular weight 10,000 and the sieving coefficient for albumin ($SC_{Alb}$) is 0.03 or lower after one hour perfusion of bovine plasma, when the measurement is made with the hollow fiber membrane incorporated into a dialyzer.

* * * * *

UNITED STATES PATENT AND TRADEMARK OFFICE
CERTIFICATE OF CORRECTION

PATENT NO. : 6,013,182
DATED : January 11, 2000
INVENTOR(S) : Shingo Emi, Kouzi Soga, and Shoji Mizutani It is certified that error appears in the above-identified patent and that said Letters Patent is hereby corrected as shown below:

Please add the following claim:

-- 12. A selectively permeable hollow fiber membrane for blood dialysis consisting substantially of cellulose derivative, obtainable by extrusion of a spinning solution containing a polymer consisting substantially of a cellulose derivative dissolved in an organic solvent, from an annular slit into a filamentous form, with simultaneous introduction of a core material solution with a water content of at least 50 wt% into said extruded filamentous body, followed by immersion of the filamentous body into a coagulating solution after passing it through a gas, and which has at least a dense layer on the innermost side and a porous layer of greater void percentage on the outside. --

Signed and Sealed this

Eleventh Day of September, 2001

*Attest:*

NICHOLAS P. GODICI
*Attesting Officer*  *Acting Director of the United States Patent and Trademark Office*